United States Patent
Seki

(10) Patent No.: US 9,853,584 B2
(45) Date of Patent: Dec. 26, 2017

(54) LOAD TORQUE ESTIMATION APPARATUS, IMAGE FORMING APPARATUS, LOAD TORQUE ESTIMATION METHOD AND RECORDING MEDIUM

(71) Applicant: Takeo Seki, Kanagawa (JP)

(72) Inventor: Takeo Seki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 50 days.

(21) Appl. No.: 15/045,720

(22) Filed: Feb. 17, 2016

(65) Prior Publication Data

US 2016/0248360 A1 Aug. 25, 2016

(30) Foreign Application Priority Data

Feb. 24, 2015 (JP) ................................ 2015-034049

(51) Int. Cl.
| | |
|---|---|
| *H02P 1/00* | (2006.01) |
| *H02P 23/14* | (2006.01) |
| *H02P 21/20* | (2016.01) |

(52) U.S. Cl.
CPC .............. *H02P 23/14* (2013.01); *H02P 21/20* (2016.02)

(58) Field of Classification Search
CPC .. H02P 21/22; H02P 6/085; H02P 6/08; H02P 21/20; H02P 25/22
USPC ................... 318/490, 715, 432, 437
See application file for complete search history.

(56) References Cited

U.S. PATENT DOCUMENTS

| | | | | | |
|---|---|---|---|---|---|
| 6,021,252 | A   * | 2/2000  | Faris    | ................... | F24F 11/0079 388/827 |
| 6,952,088 | B2 * | 10/2005 | Woodward | ................ | H02P 1/44 318/430 |
| 7,657,161 | B2 * | 2/2010  | Jeung    | .................... | F04D 27/004 318/400.01 |
| 7,971,878 | B2 * | 7/2011  | Hashimoto | ........ | G03G 15/0131 198/624 |
| 8,134,319 | B2 * | 3/2012  | Jeung    | .................... | F04D 27/004 318/432 |
| 8,384,336 | B2 * | 2/2013  | Gunji    | ...................... | H02M 1/32 318/400.26 |
| 8,402,302 | B2 * | 3/2013  | Blixt    | ...................... | H03L 1/026 368/53 |
| 2007/0126384 | A1* | 6/2007 | Takata   | ................... | H02P 27/08 318/432 |
| 2011/0234144 | A1* | 9/2011 | Maekawa  | ............... | H02P 23/04 318/702 |

(Continued)

FOREIGN PATENT DOCUMENTS

| | | |
|---|---|---|
| JP | H04-355688 | 12/1992 |
| JP | 2009-033913 | 2/2009 |
| JP | 2015-080398 | 4/2015 |

*Primary Examiner* — Bentsu Ro
*Assistant Examiner* — Thai Dinh
(74) *Attorney, Agent, or Firm* — Harness, Dickey & Pierce, P.L.C.

(57) ABSTRACT

A load torque estimation apparatus includes an acquisition unit configured to acquire a smoothed signal, the smoothed signal being obtained by smoothing a signal indicating a composite current of electric currents flowing in respective phases of an electric motor; and an estimation unit configured to estimate load torque of the electric motor based on the smoothed signal and a rotational speed of the electric motor.

12 Claims, 14 Drawing Sheets

(56) References Cited

U.S. PATENT DOCUMENTS

| | | | |
|---|---|---|---|
| 2013/0026959 A1* | 1/2013 | Sonoda | H02P 29/032 318/400.15 |
| 2014/0375234 A1* | 12/2014 | Kim | H02P 6/08 318/400.02 |
| 2015/0077027 A1 | 3/2015 | Seki et al. | |
| 2015/0077028 A1 | 3/2015 | Seki et al. | |

* cited by examiner

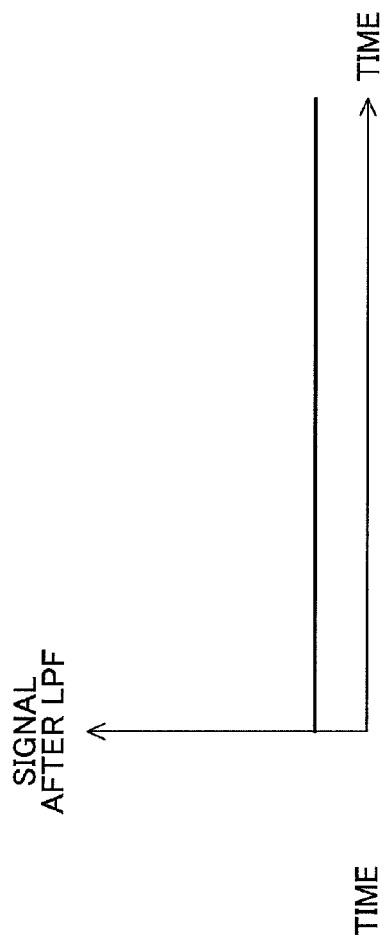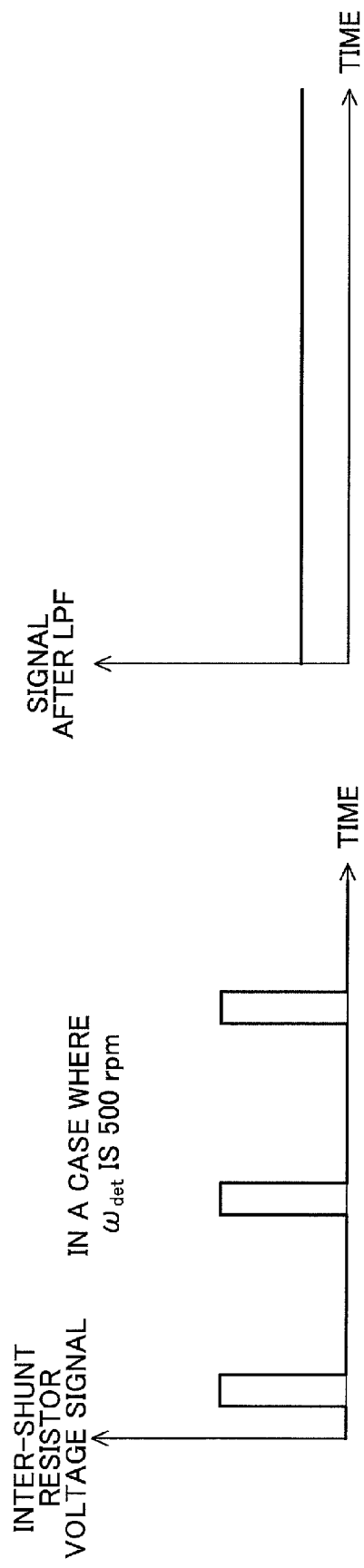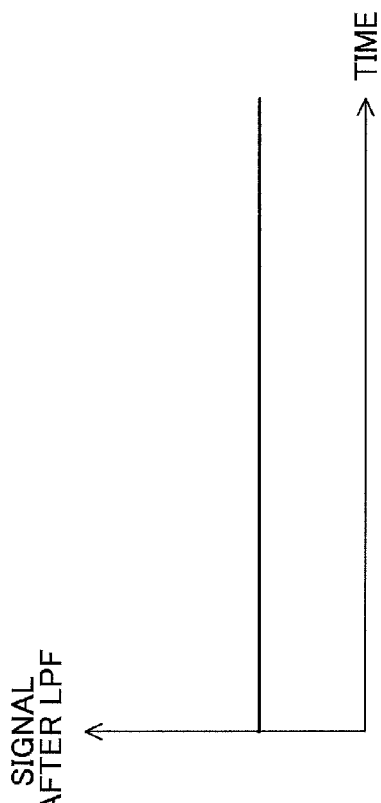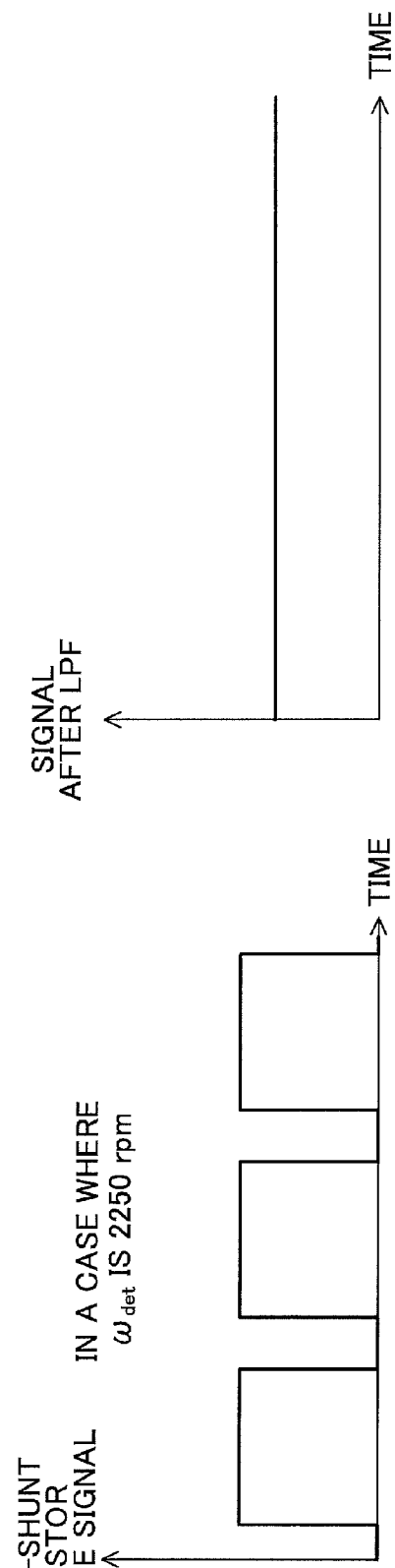

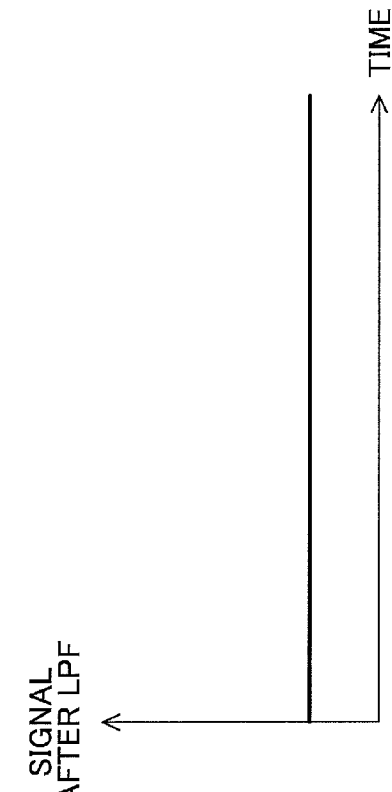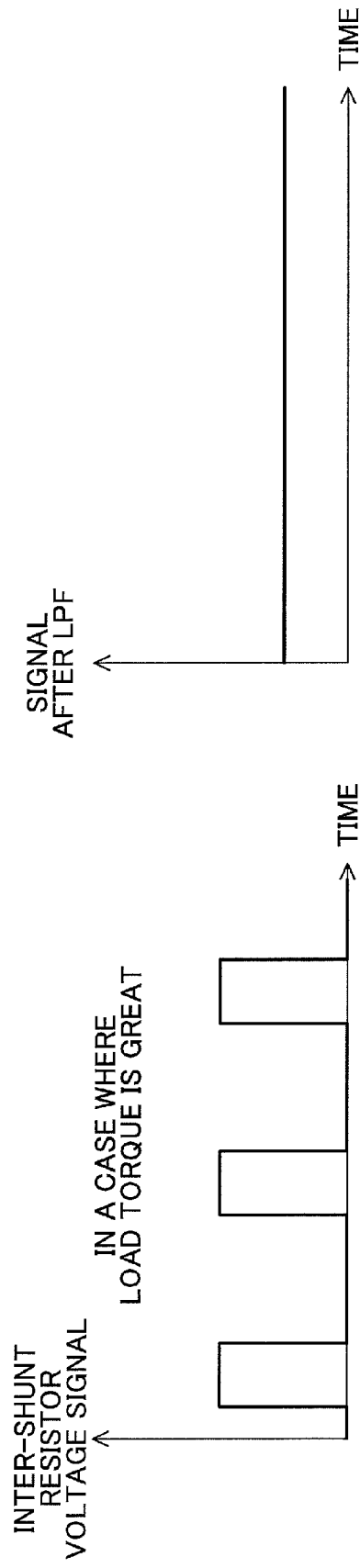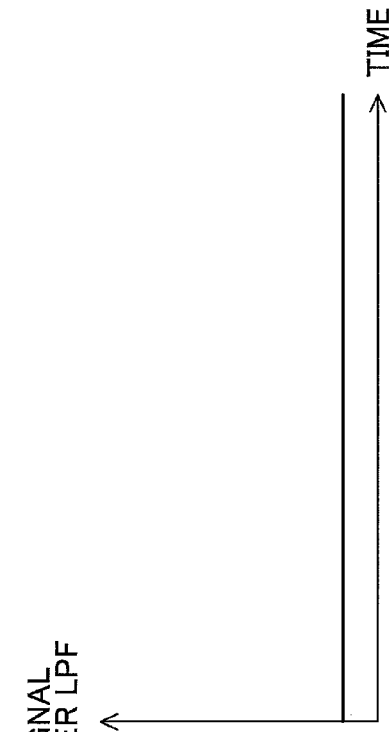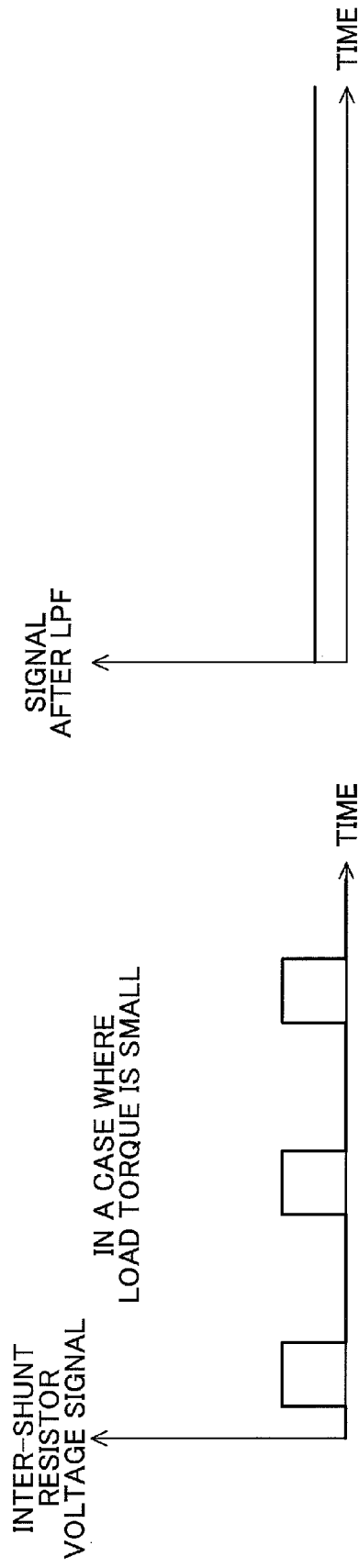

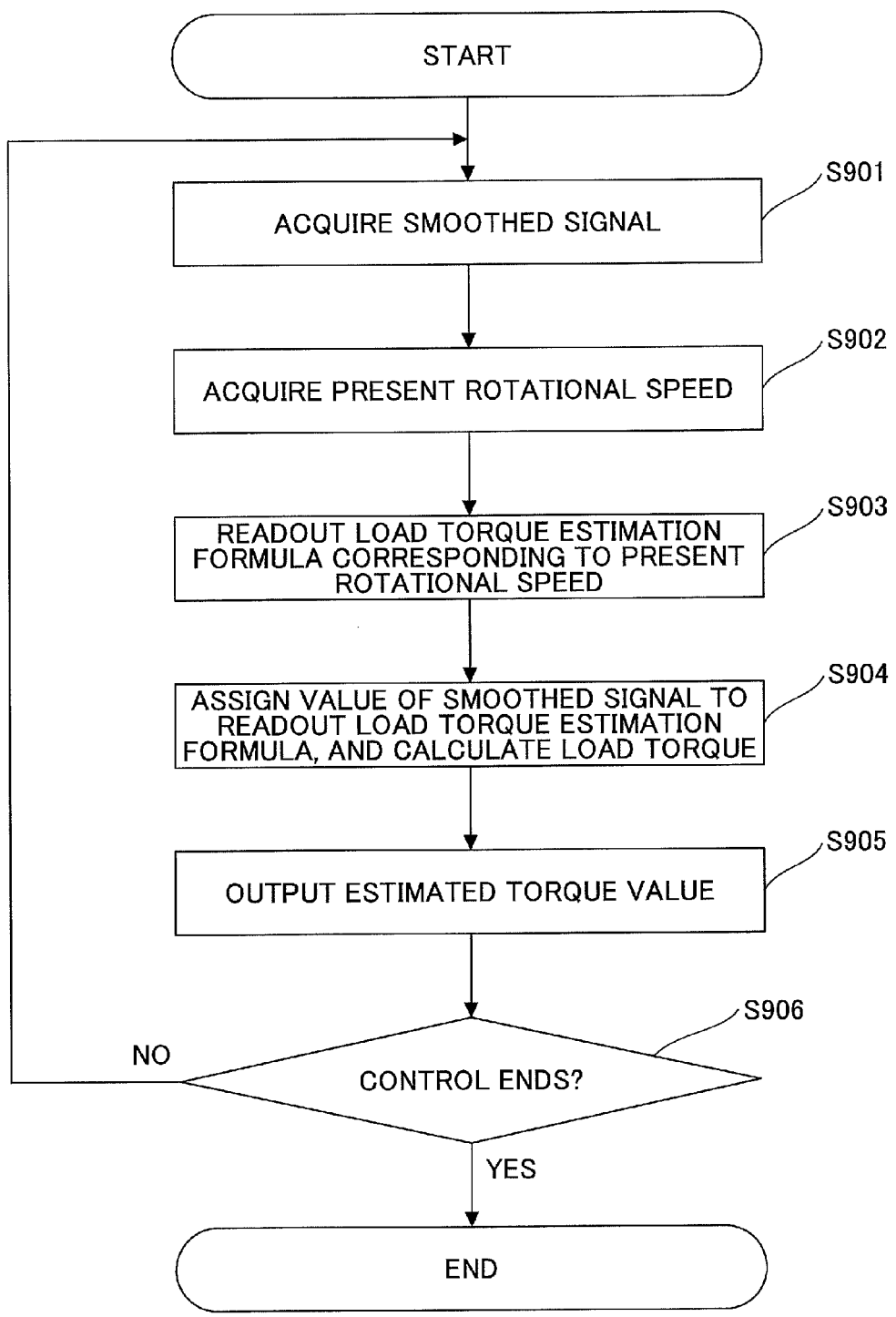

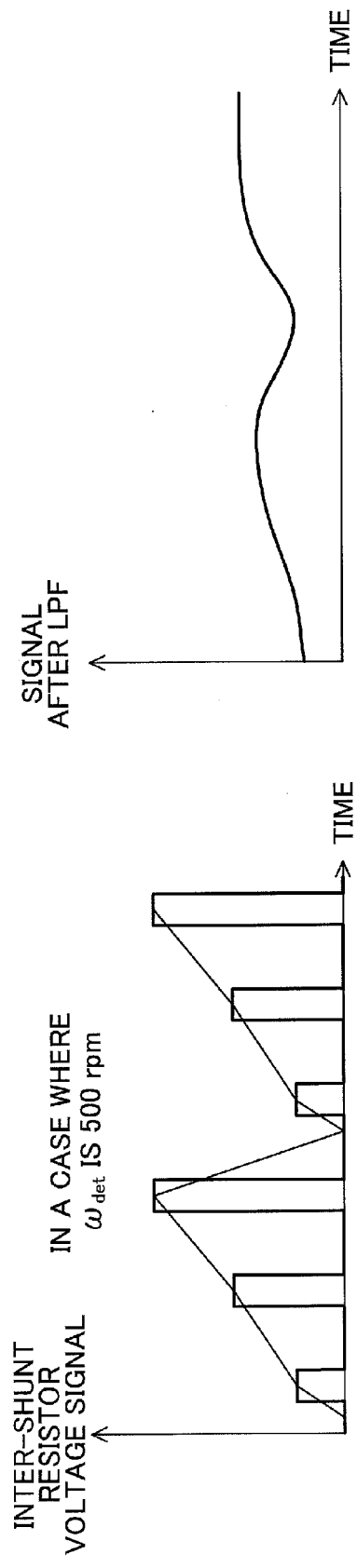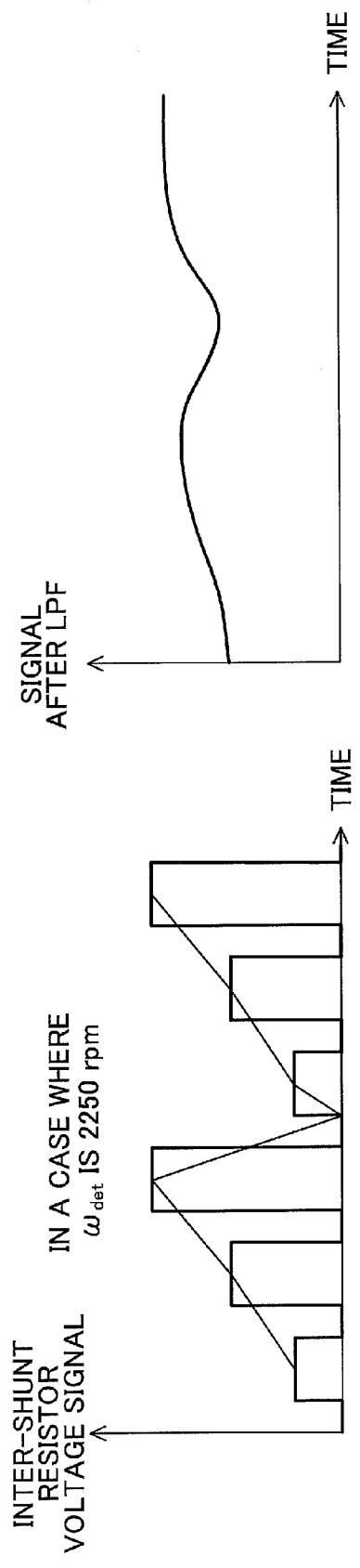

LOAD TORQUE ESTIMATION APPARATUS, IMAGE FORMING APPARATUS, LOAD TORQUE ESTIMATION METHOD AND RECORDING MEDIUM

CROSS-REFERENCE TO RELATED APPLICATIONS

The present application claims benefit of priority under 35 U.S.C. §119 of Japanese Patent Application No. 2015-034049, filed Feb. 24, 2015. The contents of this application are incorporated herein by reference in their entirety.

BACKGROUND OF THE INVENTION

1. Field of the Invention

The disclosures herein generally relate to a load torque estimation apparatus, an image forming apparatus, a load torque estimation method and a computer readable recording medium storing a program for causing a computer to execute a process.

2. Description of the Related Art

In the related art, a technology is known to estimate load torque of an electric motor during driving in a real-time manner. For example, Japanese Unexamined Patent Application Publication No. H4-355688 discloses a technology of estimating the load torque by changing a torque constant in a real-time manner based on a phase state of a conduction phase of a three-phase brushless motor and on a rotational speed of the motor.

SUMMARY OF THE INVENTION

It is a general object of at least one embodiment of the present invention to provide a load torque estimation apparatus, an image forming apparatus, a load torque estimation method and a recording medium that substantially obviate one or more problems caused by the limitations and disadvantages of the related art.

In one embodiment, a load torque estimation apparatus includes an acquisition unit configured to acquire a smoothed signal, the smoothed signal being obtained by smoothing a signal indicating a composite current of electric currents flowing in respective phases of an electric motor; and an estimation unit configured to estimate load torque of the electric motor based on the smoothed signal and a rotational speed of the electric motor.

In another embodiment, an image forming apparatus includes a load torque estimation apparatus which includes an acquisition unit configured to acquire a smoothed signal, the smoothed signal being obtained by smoothing a signal indicating a composite current of electric currents flowing in respective phases of an electric motor; and an estimation unit configured to estimate load torque of the electric motor based on the smoothed signal and a rotational speed of the electric motor.

In yet another embodiment, a load torque estimation method includes acquiring a smoothed signal, which is obtained by smoothing a signal indicating a composite current of electric currents flowing in respective phases of an electric motor; and estimating load torque of the electric motor based on the smoothed signal and a rotational speed of the electric motor.

In still yet another embodiment a non-transitory computer-readable recording medium stores a program for causing a computer of a load torque estimation apparatus to execute a process of estimating load torque of an electric motor. The process includes acquiring a smoothed signal, which is obtained by smoothing a signal indicating a composite current of electric currents flowing in respective phases of the electric motor; and estimating the load torque of the electric motor based on the smoothed signal and a rotational speed of the electric motor.

BRIEF DESCRIPTION OF THE DRAWINGS

Other objects and further features of embodiments will become apparent from the following detailed description when read in conjunction with the accompanying drawings, in which:

FIGS. 5A to 5D are diagrams illustrating an example of waveforms of respective signals in the electric current detection circuit according to the first embodiment;

FIGS. 6A to 6D are diagrams illustrating another example of waveforms of the respective signals in the electric current detection circuit according to the first embodiment;

FIG. 9 is a flowchart illustrating an example of a flow of a load torque estimation process according to the first embodiment;

FIGS. 11A to 11D are diagrams illustrating yet another example of waveforms of the respective signals in the electric current detection circuit according to the second embodiment;

DESCRIPTION OF THE PREFERRED EMBODIMENTS

Figure 1:
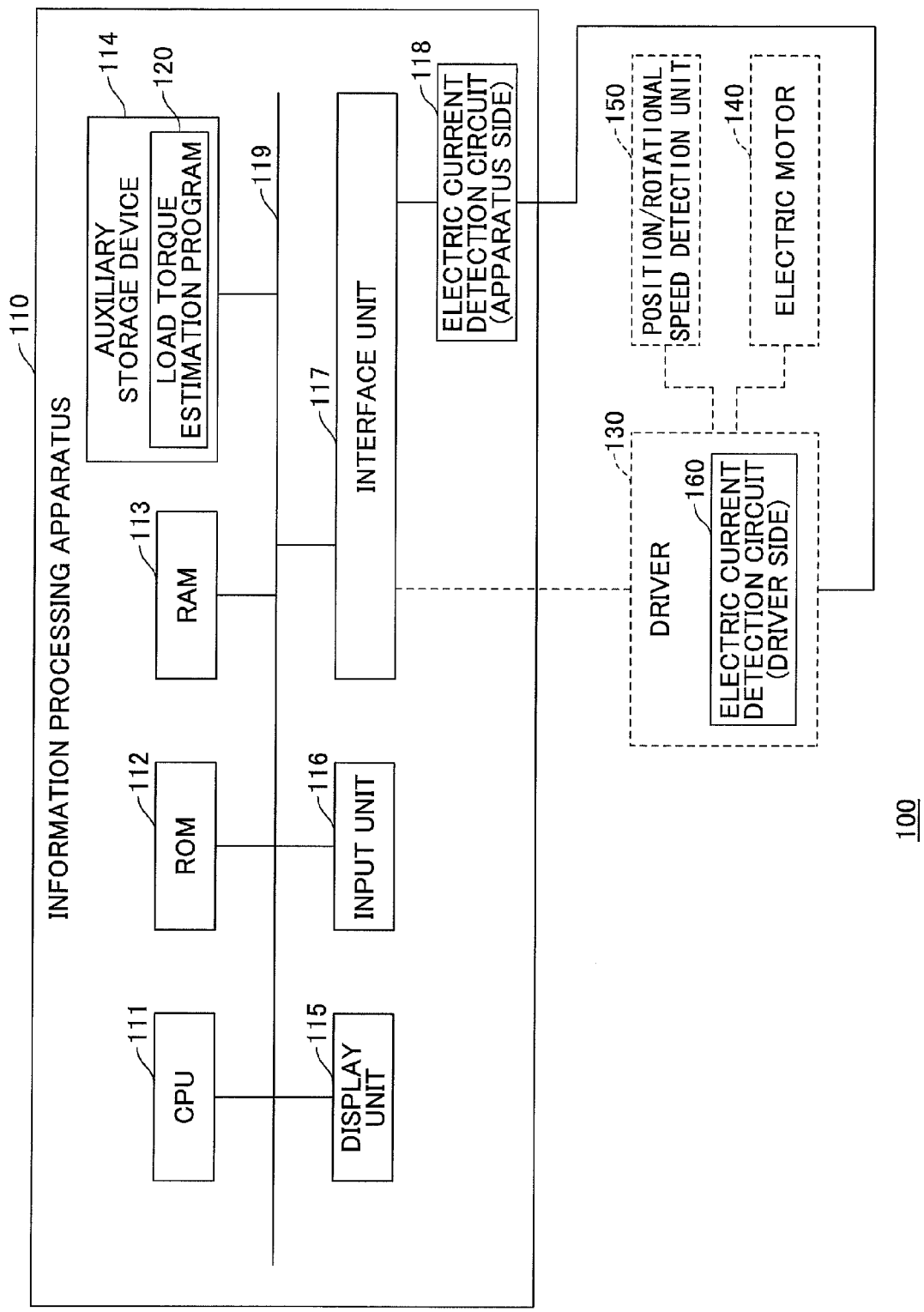
FIG. 1 is a diagram illustrating an example of a hardware configuration of a load torque estimation apparatus according to a first embodiment.

In the following, embodiments of the present invention will be described with reference to the accompanying drawings. Meanwhile, in the specification and drawings, the same reference numeral is assigned to components having essentially the same function, and thereby duplicate explanation may be omitted.

First Embodiment

<Load Torque Estimation Apparatus>

First, a hardware configuration of a load torque estimation apparatus according to the present embodiment will be described. FIG. 1 illustrates a hardware configuration of a load torque estimation apparatus 100 according to the present embodiment.

As illustrated in FIG. 1, the load torque estimation apparatus 100 includes an information processing apparatus 110 and an electric current detection circuit (driver side) 160. The information processing apparatus 110 is coupled to a driver 130 (motor driving unit) which is coupled to an electric motor 140 and a position/rotational speed detection unit 150, and controls a rotational speed or a rotational position of the electric motor 140 via the driver 130. The electric motor 140 is, for example, a brushless motor having three phases. The number of phases may be greater than three, or may be less than three. Moreover, the information processing apparatus 110 estimates load torque of the electric motor during driving. The electric current detection circuit (driver side) 160 is arranged inside the driver 130 which drives the electric driver 140, and detects a synthetic value (a composite current) of driving currents which flow in the respective phases of the electric motor 140.

The information processing apparatus 110 includes a Central Processing Unit (CPU) 111, a Read-Only Memory (ROM) 112, a Random Access Memory (RAM) 113 and an auxiliary storage device 114. The information processing apparatus 110 further includes a display unit 115, an input unit 116, an interface unit 117 and an electric current detection circuit (apparatus side) 118. The respective units/devices in the information processing apparatus 110 (the CPU 111 to the interface unit 117) are mutually coupled to each other via a bus 119.

The CPU 111 is a computer which executes various programs (e.g. a load torque estimation program 120) stored in the auxiliary storage device 114.

The ROM 112 is a nonvolatile memory. The ROM 112 functions as a main storage device which stores various programs and data necessary for the CPU 111 to execute, for example, the load torque estimation program 120. Specifically, the ROM 112 stores boot programs such as a Basic Input/Output System (BIOS), an Extensible Firmware Interface (EFI) and the like.

The RAM 113 is a main storage device such as a Dynamic Random Access Memory (DRAM), a Static Random Access Memory (SRAM) or the like. The RAM 113 functions as a work area to which various programs (e.g. the load torque estimation program 120) are loaded when they are executed by the CPU 111.

In the auxiliary storage device 114, various programs are installed. Meanwhile, in the example shown in FIG. 1, as the various programs installed in the auxiliary storage device 114, only the load torque estimation program 120 is indicated. However, other programs may be installed.

The display unit 115 displays a screen for a user to input a control target value (a target rotational speed or a target position) of the electric motor 140, a screen for showing a detection result (measured value) of the rotational speed of the electric motor 140 or a detection result (measured value) of the rotational position of the electric motor 140. Further, the display unit 115 displays a screen for showing an estimated value of load torque (estimated torque value).

The input unit 116 is an operating device for a user to perform various input operations (operations of inputting a control target value and so forth) to the information processing apparatus 110 and includes, for example, a mouse, a keyboard, or the like.

The interface unit 117 transmits a control value for controlling the electric motor 140 that is a control target to the driver 130 of the electric motor 140. Moreover, the interface unit 117 receives, from the position/rotational speed detection unit 150, information (the measured value of the rotational speed or the measured value of the rotational position) that indicates a state of the electric motor 140 that is the control target. Furthermore, the electric current detection circuit (driver side) 160 arranged in the driver 130 receives a smoothed signal, which is obtained by smoothing and amplifying a signal that indicates a synthetic value of driving currents which flow in respective phases of the electric motor 140, via the electric current detection circuit (apparatus side) 118.

The electric current detection circuit (apparatus side) 118 removes noise from a smoothed signal sent from the electric current detection circuit (driver side) 160, performs an analog/digital (A/D) conversion for the smoothed signal and inputs the smoothed signal into the interface unit 117.

The driver 130 drives the electric motor 130 based on the control value transmitted from the interface unit 117. The electric motor 140 is a three-phase brushless motor (direct-current (DC) motor).

The position/rotational speed detection unit 150 is provided to the electric motor 140 and outputs a detection signal (a signal indicating the rotational speed or a signal indicating a rotational position). The detection signal output from the position/rotational speed detection unit 150 is sent to the interface unit 117 via the driver 130, as a measured value of the rotational speed or of a measured value of the rotational position. In the present embodiment, the position/rotational speed detection unit 150 can be, for example, a two-phase encoder or a single-phase photodetector. Also, the position/rotational speed detection unit 150 can be a magnetic sensor such as a Frequency Generator (FG) sensor, a Hall element sensor or the like.

The electric current detection circuit (driver side) 160 is arranged in the driver 130, and acquires a smoothed signal by smoothing and amplifying a signal that indicates a synthetic value of driving currents which flow in respective phases of the electric motor 140. In the electric current detection circuit (driver side) 160, the acquired smoothed signal is sent to the electric current detection circuit (apparatus side) 118.

<Functional Configuration of Load Torque Estimation Unit>

Figure 2:
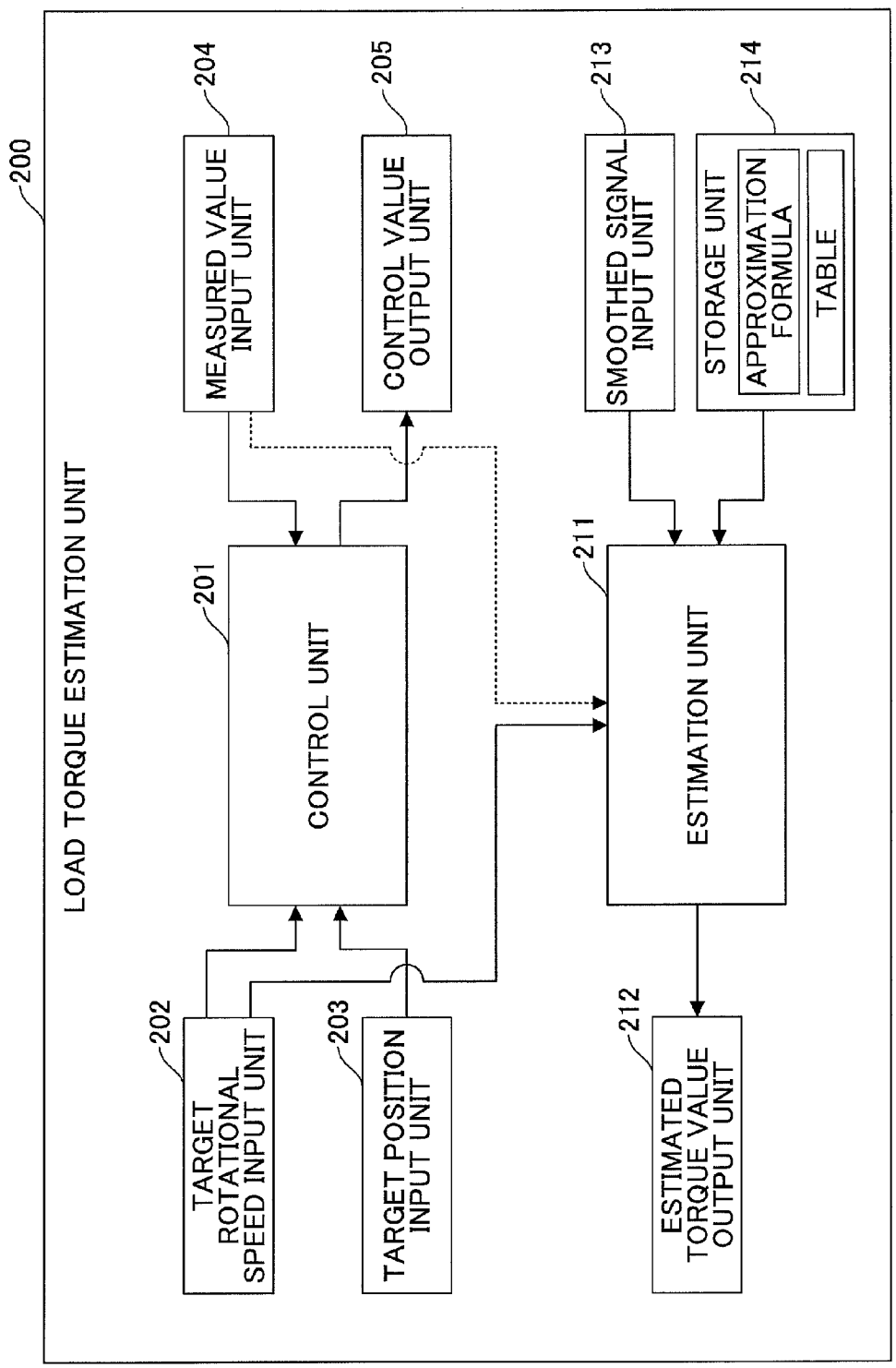
FIG. 2 is a diagram illustrating an example of a functional configuration of a load torque estimation unit enabled by executing a load torque estimation program according to the first embodiment.

Next, functions of a load torque estimation unit implemented from execution of the load torque estimation program 120 by the CPU 111 will be described. FIG. 2 is a functional configuration diagram illustrating a load torque estimation unit 200 implemented as a result of the load torque estimation program 120 being executed by the CPU 111.

In FIG. 2, a target rotational speed input unit 202 and a target position input unit 203 acquire a control target value (a target rotational speed or a target position) that is input by a user using the input unit 116, and input the control target value to a control unit 201.

A measured value input unit 204 acquires the measured value of the rotational speed or the measured value of the rotational position of the electric motor 140, received via the interface unit 117, and inputs the acquired measured value to the control unit 201.

The control unit 201 calculates a control value (voltage value) for controlling the electric motor 140 based on the control target value (the target rotational speed or the target position) that is input, and the measured value of the rotational speed or the measured value of the rotational position that is input.

A control value output unit 205 transmits the control value (voltage value) calculated by the control unit 201 to the driver 130 via the interface unit 117.

A smoothed signal input unit 213 acquires the smoothed signal input from the electric current detection circuit (apparatus side) 118 via the interface unit 117, and inputs the smoothed signal into an estimation unit 211 (i.e. the smoothed signal input unit 213 functions as an acquisition unit for acquiring a smoothed signal).

A storage unit 214 stores relation information, which defines a relation between a smoothed signal and load torque, in association with respective rotational speeds of the electric motor 140. Meanwhile, the storage unit 214 may store the relation between the smoothed signal and the load torque as an approximation formula, or may store the relation between the smoothed signal and the load torque as a table.

An estimation unit 211 estimates load torque of the electric motor 140. Specifically the estimation unit 211 reads out from the storage unit 214 the relation information in response to the target rotational speed input at the target rotational speed input unit 202 or the measured value of rotational speed acquired at the measured value input unit 204. Then, the estimation unit 211 estimates the load torque by calculating load torque according to the smoothed signal input from the smoothed signal input unit 213 based on the relation information readout from the storage unit 214.

An estimated torque output unit 212 outputs load torque estimated by the estimation unit 211 as an estimated torque value. Note that a destination to which the estimated value is output can be the auxiliary storage device 114 or the display unit 115. Alternatively, the estimated value can be output to an external apparatus via the interface unit 117.

<Description of Motor Control Block Diagram>

Figure 3:
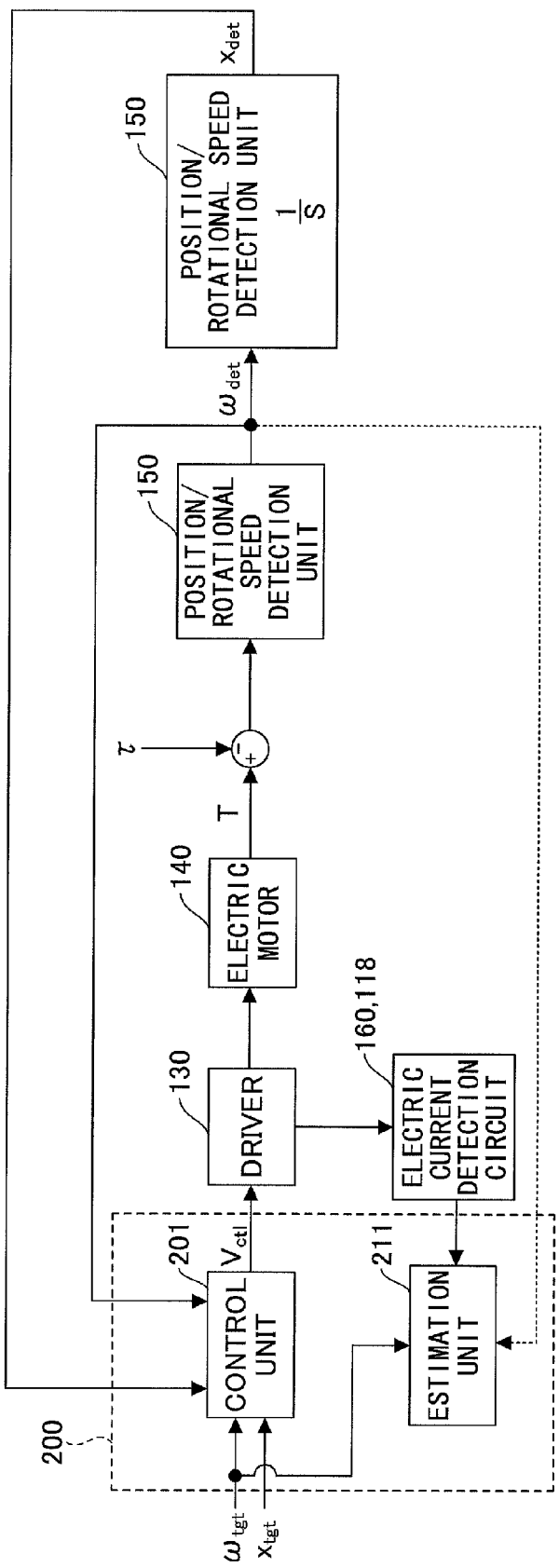
FIG. 3 is a block diagram for controlling an electric motor and estimating load torque according to the first embodiment.

Next, a block diagram will be described for controlling the rotational speed or the rotational position of the electric motor 140 and estimating the load torque of the electric motor 140. FIG. 3 is a block diagram for controlling the rotational speed or the rotational position of the electric motor 140 and estimating the load torque of the electric motor 140.

As shown in FIG. 3, the control unit 201 outputs a control value (voltage value $V_{ctl}$) based on the control target value (the target rotational speed $\omega_{tgt}$ or the target position $x_{tgt}$) and the measured value (the measured value $\omega_{det}$ of the rotational speed or the measured value $x_{det}$ of the rotational position) that is fed back.

The driver 130 applies driving currents to the respective phases of the electric motor 140 based on the control value (voltage value $V_{ctl}$) output from the control unit 201. Meanwhile, a synthetic value of the driving currents flowing in the respective phases of the electric motor 140 is detected by the electric current detection circuit (driver side) 160 via a shunt resistor of the driver, which will be described later. The detected synthetic value is smoothed and amplified at the electric current detection circuit (driver side) 160, and is input to the estimation unit 211 via the electric current detection circuit (apparatus side) 118.

The electric motor 140 generates a predetermined rotational torque T due to the driving currents flowing in the respective phases of the electric motor 140, and the electric motor 140 is driven.

In contrast thereto, the electric motor 140 receives load torque τ and therefore, the electric motor 130 rotates at a rotational speed according to a difference between the rotational torque T and the load torque τ.

The position/rotational speed detection unit 150 detects the rotational speed of the electric motor 140 and feeds a measured value of the rotational speed $\omega_{det}$ back to the control unit 201.

Alternatively, the position/rotational speed detection unit 150 calculates a rotational position based on the detected rotational speed (or directly detects the rotational position) and feeds the rotational position back as a measured value $x_{det}$ of the rotational position to the control unit 201.

Thus, by carrying out feedback control based on the measured value $\omega_{det}$ of the rotational speed or the measured value $x_{det}$ of the rotational position, the electric motor 140 is controlled to be at the target rotational speed $\omega_{tgt}$ or the target position $x_{tgt}$.

On the other hand, in parallel with the control of the rotational speed or the control of the rotational position of the electric motor 140, the estimation unit 211 successively estimates load torque. Specifically, the load torque is estimated by calculating load torque based on the target rotational speed $\omega_{tgt}$ or the measured value of rotational speed $\omega_{det}$ and on the smoothed signal input via the electric current detection circuit (apparatus side) 118.

Note that the controlling target value (target rotational speed $\omega_{tgt}$ of the target position $x_{tgt}$) or the measured value (the measured value $\omega_{det}$ of the rotational speed or the measured value $x_{det}$ of the rotational position) is output every control period of the control unit 201. Therefore, in the estimation unit 211, it is possible to estimate the load torque every control period of the control unit 201.

<Circuit Configuration of Driver, Electric Motor and Electric Current Detection Circuit>

Figure 4:
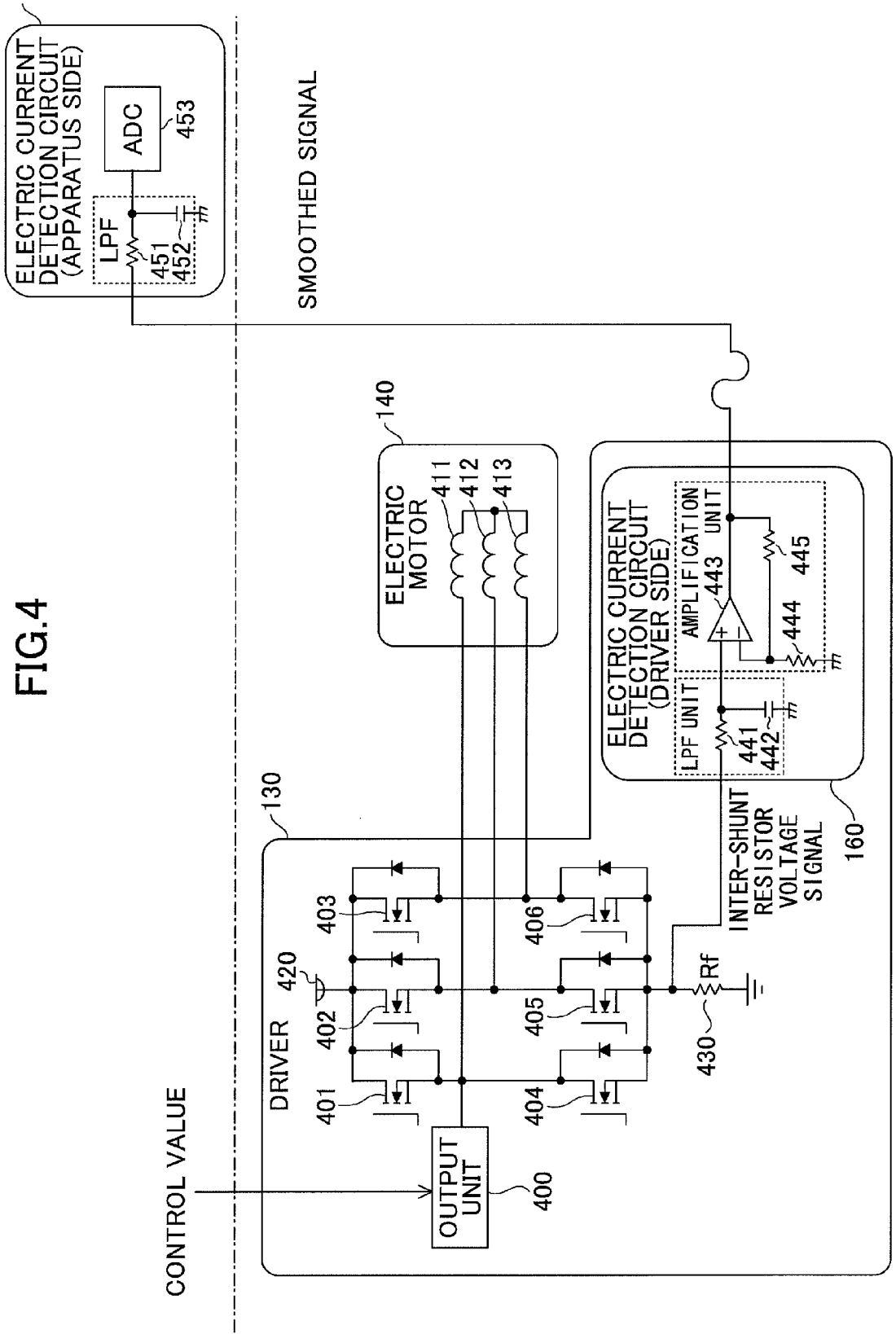
FIG. 4 is a diagram illustrating an example of a circuit configuration of a driver, an electric motor and an electric current detection circuit according to the first embodiment.

Next, circuit configurations of the driver 130, the electric motor 140 and the electric current detection circuit (driver side) 160 and the electric current detection circuit (apparatus side) 118 will be described. FIG. 4 is a diagram illustrating the circuit configurations of the driver 130, the electric motor 140 and the electric current detection circuit (driver side) 160 and the electric current detection circuit (apparatus side) 118. Meanwhile, in FIG. 4, for simplification of explanation, a Hall element or the like included in the configuration of the electric motor 140 which is a three-phase brushless motor is omitted.

As shown in FIG. 4, the driver 130 includes transistors 401 to 406. Emitter terminals of the transistors 401 to 403 are coupled to collector terminals of the transistors 404 to 406, respectively. A connecting part of the transistor 401 and the transistor 404 is coupled to a stator winding 411. Similarly, a connecting part of the transistor 402 and the transistor 405 is coupled to a stator winding 412, and a connecting part of the transistor 403 and the transistor 406 is coupled to a stator winding 413.

The transistors 401 to 406 switch whether to apply driving currents from a power source 420 by an output unit 400 switching ON/OFF. Therefore, the transistors 401 to 406 switch the phases of the electric motor 140 to apply driving currents, i.e. excitation phases of the electric motor 140 (stator winding for exciting among the stator windings 411 to 413).

The shunt resistor 430 is coupled to emitter terminals of the transistors 404 to 406, and detects a synthetic value of the driving currents flowing in one or more the transistors 401 to 406 from the power source 420. The synthetic value of driving currents detected at the shunt resistor 430 is input to the electric current detection circuit (driver side) 160 as an inter-shunt resistor voltage signal.

Meanwhile, the inter-shunt resistor voltage signal has a pulsed waveform and has characteristics such that the higher the load torque is, the greater an amplitude is and such that the higher the rotational speed is, the greater the duty ratio is. The inter-shunt resistor voltage signal is a weak signal having amplitude of about several tens of millivolts.

The electric current detection circuit (driver side) 160 includes a low-pass filter unit configured with a resistor 441 and a capacitor 442, and an amplification unit including a comparator 443, an amplification factor of which is specified by a resistor 444 and a resistor 445. Therefore, the inter-shunt resistor voltage signal input to the electric current detection circuit (driver side) 160 is smoothed by the low-pass filter unit, amplified by the amplification unit, and input to the electric current detection circuit (apparatus side) 118 as a smoothed signal.

The electric current detection circuit (apparatus side) 118 includes another low-pass filter unit configured with a resistor 451 and a capacitor 452, and an A/D converter 453. Noise added to the smoothed signal from being output from the electric current detection circuit (driver side) 160 to being input to the electric current detection circuit (apparatus side) 118 is removed at the other low-pass filter unit. Furthermore, the smoothed signal, from which noise is removed, is digitized at the A/D converter 453 and input to the interface unit 117 of the information processing apparatus 110.

In this way, in the present embodiment, the driving current for the electric motor 140 is detected as an inter-shunt resistor voltage signal via the shunt resistor 430, and acquired as a smoothed signal. In general, the shunt resistor 430 is arranged in the driver 130 of the electric motor 140 in advance. The electric current detection circuit (driver side) 160 for acquiring a smoothed signal can be configured with a resistor, a capacitor and a comparator. That is, a configuration for detecting a driving current of the electric motor 140 as an inter-shunt resistor voltage signal, and for acquiring a smoothed signal can be realized at low cost. As a result, compared with the related art, load torque can be estimated at low cost.

<Description of Smoothed Signal>

Next, a smoothed signal acquired at the electric current detection circuit (driver side) 160 will be described. FIGS. 5A to 6D are diagrams for explaining a smoothed signal. FIG. 5A is a diagram illustrating an example of an inter-shunt voltage signal in a case where a measured value of rotational speed $\omega_{det}$ is 500 rpm with a predetermined load torque. FIG. 5B is a diagram illustrating an example of a smoothed signal output from the electric current detection circuit (driver side) 160 obtained by smoothing the inter-shunt resistor voltage signal shown in FIG. 5A at the low-pass filter unit and amplifying it at the amplification unit.

On the other hand, FIG. 5C is a diagram illustrating an example of an inter-shunt voltage signal in a case where the measured value of rotational speed $\omega_{det}$ is 2250 rpm with the predetermined load torque. FIG. 5D is a diagram illustrating an example of a smoothed signal output from the electric current detection circuit (driver side) 160 obtained by smoothing the inter-shunt resistor voltage signal shown in FIG. 5C at the low-pass filter unit and amplifying it at the amplification unit.

As shown in FIGS. 5A to 5D, the inter-shunt resistor voltage signals have pulsed waveforms, and the higher the rotational speed is, the greater the duty ratio is. Therefore, the higher the rotational speed is, the greater a value of the smoothed signal after smoothing at the low-pass filter unit is (see FIG. 5D). The lower the rotational speed is, the smaller the value of the smoothed signal is (see FIG. 5B).

FIG. 6A is a diagram illustrating an example of an inter-shunt resistor voltage signal in a case where load torque is high with a predetermined rotational speed. FIG. 6B is a diagram illustrating an example of a smoothed signal output from the electric current detection circuit (driver side) 160 obtained by smoothing the inter-shunt resistor voltage signal shown in FIG. 6A at the low-pass filter unit and amplifying it at the amplification unit.

On the other hand, FIG. 6C is a diagram illustrating an example of an inter-shunt resistor voltage signal in a case where the load torque is low with the predetermined rotational speed. FIG. 6D is a diagram illustrating an example of a smoothed signal output from the electric current detection circuit (driver side) 160 obtained by smoothing the inter-shunt resistor voltage signal shown in FIG. 6C at the low-pass filter unit and amplifying it at the amplification unit.

As shown in FIGS. 6A to 6D, the higher the load torque is, the greater the amplitude of the inter-shunt resistor voltage signal is. Therefore, the higher the load torque is, the greater a value of the smoothed signal after smoothing at the low-pass filter unit is (see FIG. 6B). The lower the load torque is, the smaller the value of the smoothed signal is (see FIG. 5D).

That is, the smoothed signal generated based on the inter-shunt resistor voltage signal varies depending on the rotational speed of the electric motor 140 and on the load torque. Therefore, the values of the smoothed signal obtained experimentally by changing the load torque for the respective rotational speeds can be stored as relation information. Then, in a case of acquiring a rotational speed of the electric motor 150 during driving and the smoothed signal, load torque can be estimated in a real-time manner by using the stored relation information.

<Description of Relation Information>

Figure 7A:
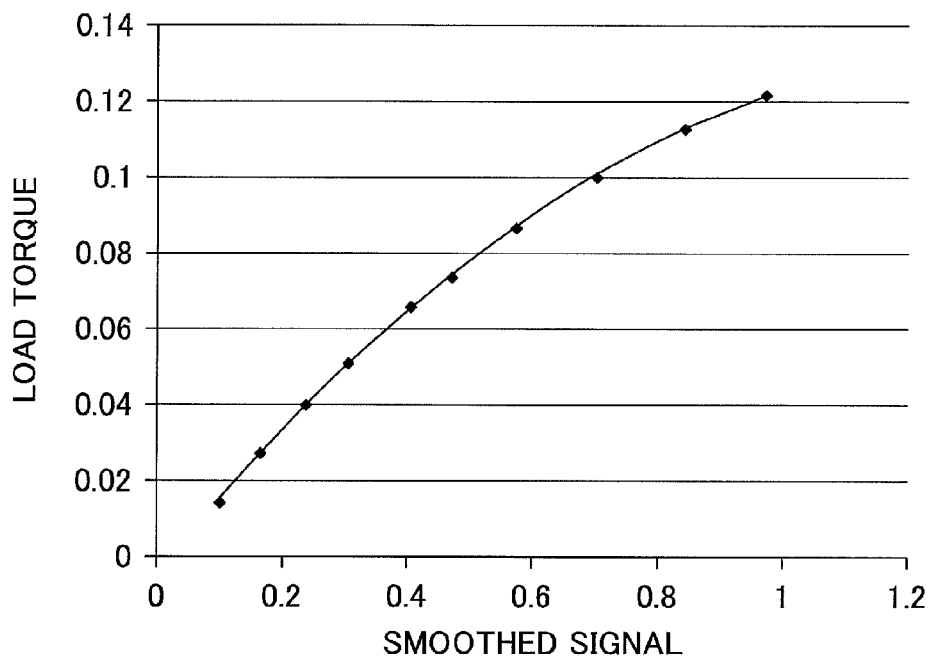
FIGS. 7A and 7B are diagrams illustrating examples of relation between a smoothed signal and load torque at respective rotational speed according to the first embodiment.
Figure 7B:
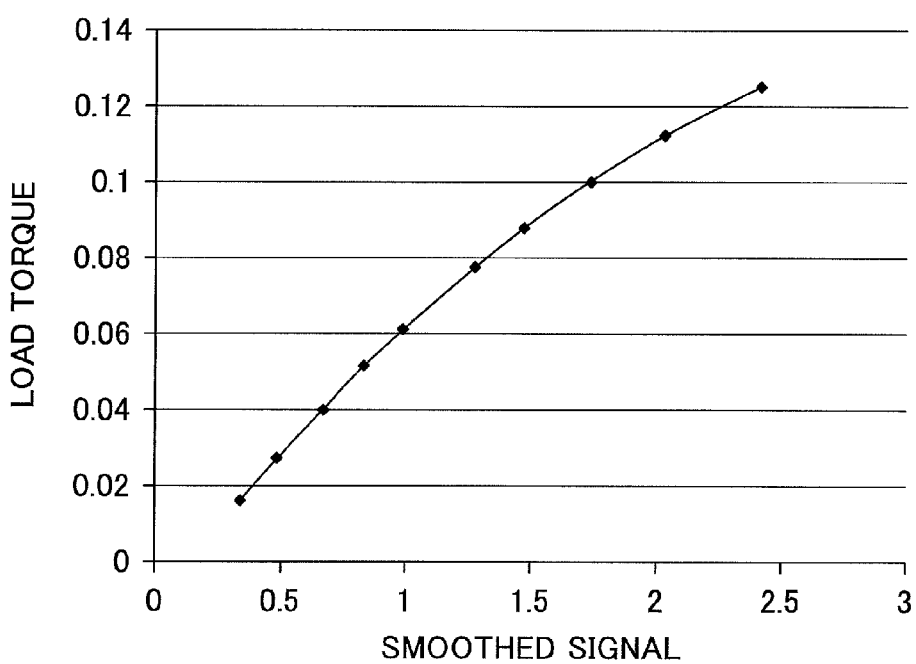

Next, the relation information stored in the storage unit 214 will be described. FIGS. 7A and 7B are diagrams illustrating an example of the relation information. In FIGS. 7A and 7B, an abscissa represents a value of the smoothed signal and an ordinate represents a value of the load torque.

FIG. 7A is a graph illustrating a relation between the smoothed signal and the load torque obtained experimentally in a case where the rotational speed is 750 rpm. Moreover, FIG. 7B is a graph illustrating a relation between the smoothed signal and the load torque obtained experimentally in a case where the rotation speed is 2250 rpm.

In a case of approximating the respective graphs by a second order polynomial (load torque estimation formula) where τ and n are a value of the load torque and a value of the smoothed signal, respectively, the load torque estimation formula for FIG. 7A is: load torque $\tau=-0.0759n^2+0.2031n-0.0048$. Moreover, the load torque estimation formula for FIG. 7B is: load torque $\tau=-0.0114n^2+0.0841n-0.0113$.

The load torque estimation apparatus 100 according to the present embodiment stores the load torque estimation formula calculated as above in the storage unit 214 in association with the rotational speed. Thus, in the estimation unit 211, by acquiring a rotational speed of the electric motor 140 during driving and a value of the smoothed signal, load torque can be estimated. Meanwhile, the storage unit 214 may store a table instead of the load torque estimation formula. Specifically, the storage unit 214 may store a table in which a value of the smoothed signal n is associated with load torque which is calculated by inputting the value of the smoothed signal n into the load torque estimation formula.

<Functional Configuration of Estimation Unit>

Figure 8A:
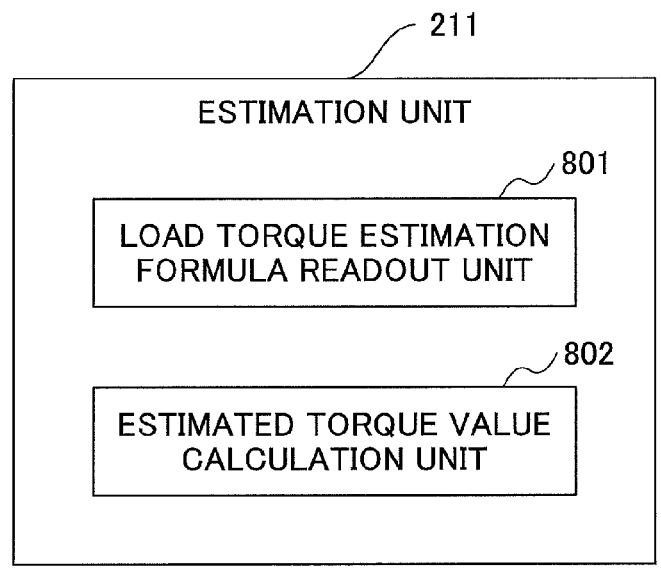
FIGS. 8A and 8B are diagrams for explaining an example of functions of the estimation unit according to the first embodiment.
Figure 8B:
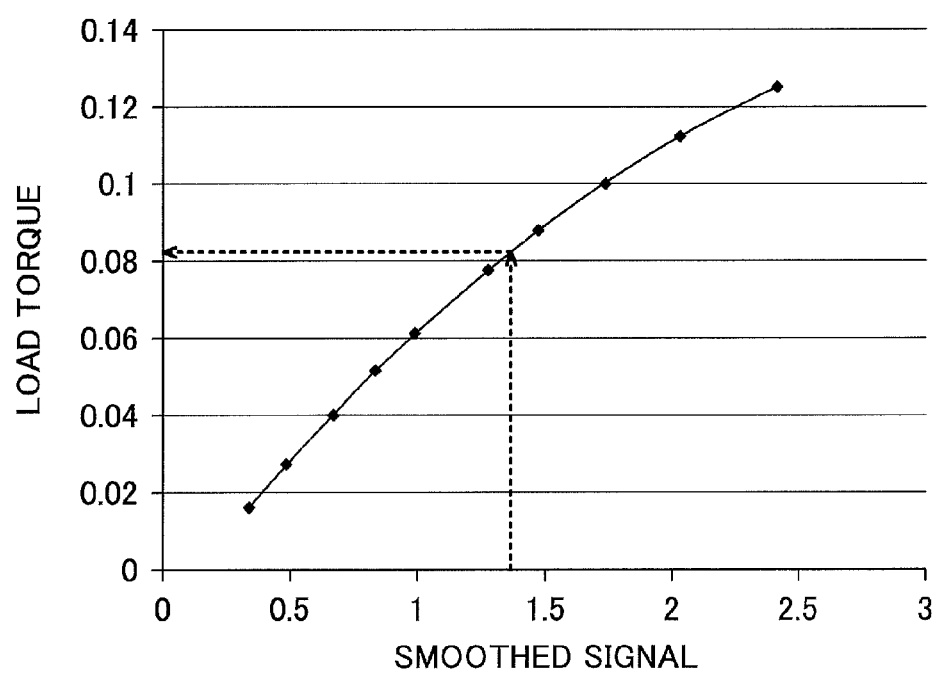

Next, functions of the estimation unit 211 will be described. FIGS. 8A and 8B are diagrams illustrating functions of the estimation unit 211. FIG. 8A is a diagram illustrating a functional configuration of the estimation unit 211. FIG. 8B is a diagram illustrating a specific example of processing in a case where the estimation unit 211 estimates load torque when the rotational speed is 2250 rpm.

As shown in FIG. 8A, the estimation unit 211 includes a load torque estimation formula readout unit 801 and an estimated torque value calculation unit 802.

The load torque estimation formula readout unit 801 reads out a load torque estimation formula from the storage unit 214 based on a target rotational speed input from the target rotational speed input unit 202 or a measured value of rotational speed input from the measured value input unit 204. As described above, since in the storage unit 214, the respective load torque estimation formulas are stored in association with rotational speeds, the load torque estimation formula readout unit 801 reads out a load torque estimation formula associated with the input rotational speed.

The estimated torque value calculation unit 802 calculates load torque by assigning the value of the smoothed signal input from the smoothed signal input unit 213 to the load torque estimation formula readout by the load torque estimation formula readout unit 801.

FIG. 8B shows that the load torque estimation formula readout unit 801 reads out a load torque estimation formula corresponding to the rotational speed of 2250 rpm, assigning the value 1.35 of the smoothed signal to the load torque estimation formula, and thereby calculates the load torque of 0.085.

<Flow of Load Torque Estimation Processing>

Next, a flow of the load torque estimation processing by the load torque estimation unit 200 will be described. FIG. 9 is a flowchart illustrating the flow of the load torque estimation processing by the load torque estimation unit 200.

In a case where a control of a rotational speed or a rotational position of the electric motor 140 by the control unit 201 starts, the load torque estimation processing shown in FIG. 9 starts. The smoothed signal input unit 213 acquires a smoothed signal from the electric current detection circuit (apparatus side) 118 and inputs the smoothed signal to the estimation unit 211 (step S901).

The target rotational speed input unit 202 acquires a target rotational speed and inputs it to the estimation unit 211 (step S902). Alternatively, the measured value input unit 204 acquires a measured value of rotational speed and inputs it to the estimation unit 211.

The load torque estimation formula readout unit 801 of the estimation unit 211 reads out from the storage unit 214 a load torque estimation formula corresponding to the input rotational speed (step S903).

The estimated torque value calculation unit 802 of the estimation unit 211 assigns a value of a smoothed signal to the readout load torque estimation formula, to calculate load torque (step S904).

The estimated torque value output unit 212 outputs the calculated load torque as an estimated torque value (step S905). The estimation unit 211 determines whether the control of the rotational speed or the rotational position by the control unit 201 ends (step S906). In a case of determining that the control does not end, the process returns to step S901. On the other hand, in a case of determining that the control ends, the load torque estimation processing ends.

<Summary>

As can be seen from the above description, the load torque estimation apparatus 100 according to the present embodiment has the following features:

an electric current detection circuit is coupled to a shunt resistor of a driver, to detect an inter-shunt resistor voltage signal;

the detected inter-shunt resistor voltage signal is smoothed and amplified, to acquire a smoothed signal that varies in response to a rotational speed of an electric motor and load torque;

relations between smoothed signals and load torques at respective rotational speeds are obtained experimentally as relation information (load torque estimation formulas), and are stored in a storage unit; and a load torque estimation formula corresponding to a rotational speed of the electric motor during driving is readout, the smoothed signal of the electric motor during driving is assigned to the load torque estimation formula, and thereby an estimated torque value is output.

In this way, a driving current of an electric motor used for an estimation of load torque is detected as an inter-shunt resistor voltage signal, a smoothed signal is acquired, and thereby it is possible to acquire a signal indicating the driving current of the electric motor at low cost.

There is a conventional problem that in order to detect the phase state of the conduction phase, a capability for acquiring a reference phase detection pulse is required to be added to the motor driver, which raises a cost.

According to the first embodiment of the present invention, load torque of an electric motor can be estimated at low cost.

Second Embodiment

In a second embodiment, a case where a circuit configuration which is different from the first embodiment is used, when a driving current of the electric motor used for the estimation of load torque is detected as an inter-shunt resistor voltage signal and a smoothed signal is acquired, will be described.

<Circuit Configuration of Driver, Electric Motor and Electric Current Detection Circuit>

Figure 10:
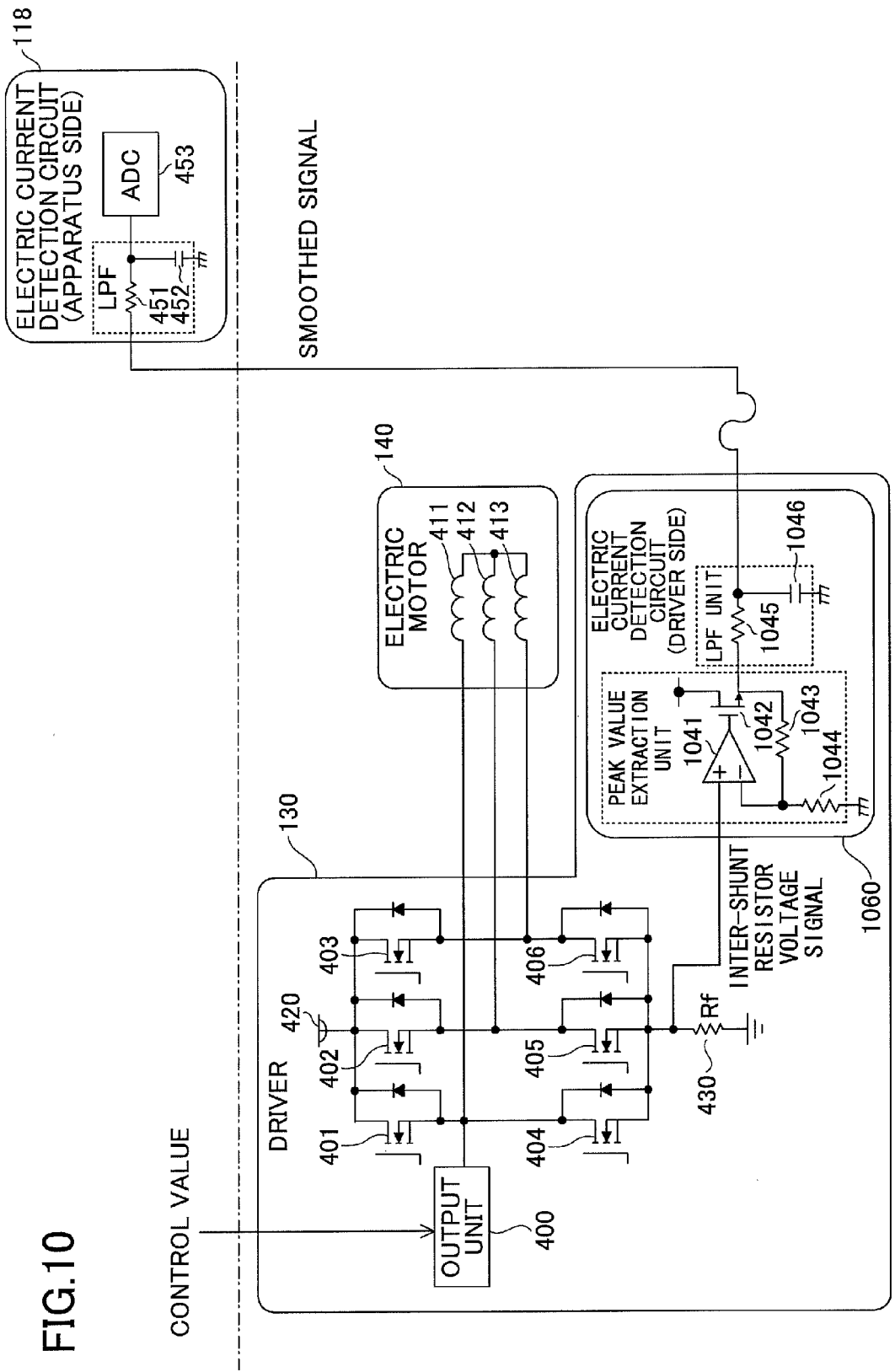
FIG. 10 is a diagram illustrating another example of the circuit configuration of the driver, the electric motor and the electric current detection circuit according to a second embodiment.

FIG. 10 is a diagram illustrating a circuit configuration of a driver, an electric motor and electric current detection circuits according to the second embodiment. Meanwhile, since the circuit configurations of a driver 130, an electric motor 140 and an electric current detection circuit (apparatus side) 118, as shown in FIG. 10, are the same as the configurations of the driver 130, the electric motor 140 and the electric current detection circuit (apparatus side) 118 as shown in FIG. 4, an explanation thereof will be omitted here. A difference from FIG. 4 is an electric current detection circuit (driver side) 1060.

The electric current detection circuit (driver side) 1060 includes a peak value extraction unit configured with a comparator 1041, an FET 1042 and resistors 1043, 1044; and a low-pass filter unit configured with a resistor 1045 and a capacitor 1046. After a peak value is extracted by the peak value extraction unit and amplified, a change of the peak value is smoothed by the low-pass filter unit, and an inter-shunt resistor voltage signal is sent to the electric current detection circuit (apparatus side) 118 as a smoothed signal.

In this way, in the present embodiment, when a driving signal of the electric motor 140 used for the estimation of load torque is detected as an inter-shunt resistor voltage signal and a smoothed signal is acquired, a peak value of a pulse of an inter-shunt resistor voltage is extracted.

<Description of Smoothed Signal>

Next, a smoothed signal acquired at the electric current detection circuit (driver side) 1060 will be described. FIGS. 11A to 11D are diagrams for explaining the smoothed signal. FIG. 11A illustrates a process of extracting peak values at the peak value extraction unit for an inter-shunt resistor voltage signal in a case where a measured value of rotational speed $\omega_{det}$ is 500 rpm. Moreover, FIG. 11B illustrates an example of a smoothed signal which is obtained by, at the low-pass filter unit, smoothing changes in the peak values of respective pulses of the inter-shunt resistor voltage signal extracted in FIG. 11A.

On the other hand, FIG. 11C illustrates a process of extracting peak values at the peak value extraction unit for the inter-shunt resistor voltage signal in a case where the measured value of rotational speed $\omega_{det}$ is 2250 rpm. Moreover, FIG. 11D illustrates an example of a smoothed signal which is obtained by, at the low-pass filter unit, smoothing changes in the peak values of respective pulses of the inter-shunt resistor voltage signal extracted in FIG. 11C.

As shown in FIGS. 11A to 11D, even if the rotational speeds are made constant, respectively, in a case where load torque varies, amplitudes of the respective pulses of the inter-shunt resistor voltage signal increase and decrease with the passage of time. Therefore, by extracting a peak value at the peak value extraction unit, it is possible to detect the inter-shunt resistor voltage signal more accurately.

In this way, when a smoothed signal is acquired based on the inter-shunt resistor voltage signal, peak values of respective pulses of the inter-shunt resistor voltage signal are extracted and amplified, input in the low-pass filter unit and smoothed, and thereby a more accurate smoothed signal can be acquired.

<Summary>

As can be seen from the above description, the load torque estimation apparatus 100 according to the present embodiment has the following feature.

When load torque is estimated according to the processing which is the same as the first embodiment, the electric current detection circuit (driver side) extracts peak values of the respective pulses of the detected inter-shunt resistor voltage signal, and performs amplifying and smoothing, to acquire the smoothed signal.

Therefore, the same effect as in the first embodiment can be obtained, and load torque can be estimated more accurately.

Third Embodiment

In the first and second embodiments, relations between smoothed signals and load torques are obtained experimentally with respective rotational speeds, to calculate load torque estimation formulas at the respective rotational speeds. However, it is not necessary to obtain experimental relation information defining the relation between smoothed signals and load torques with all the rotational speeds.

Figure 12:
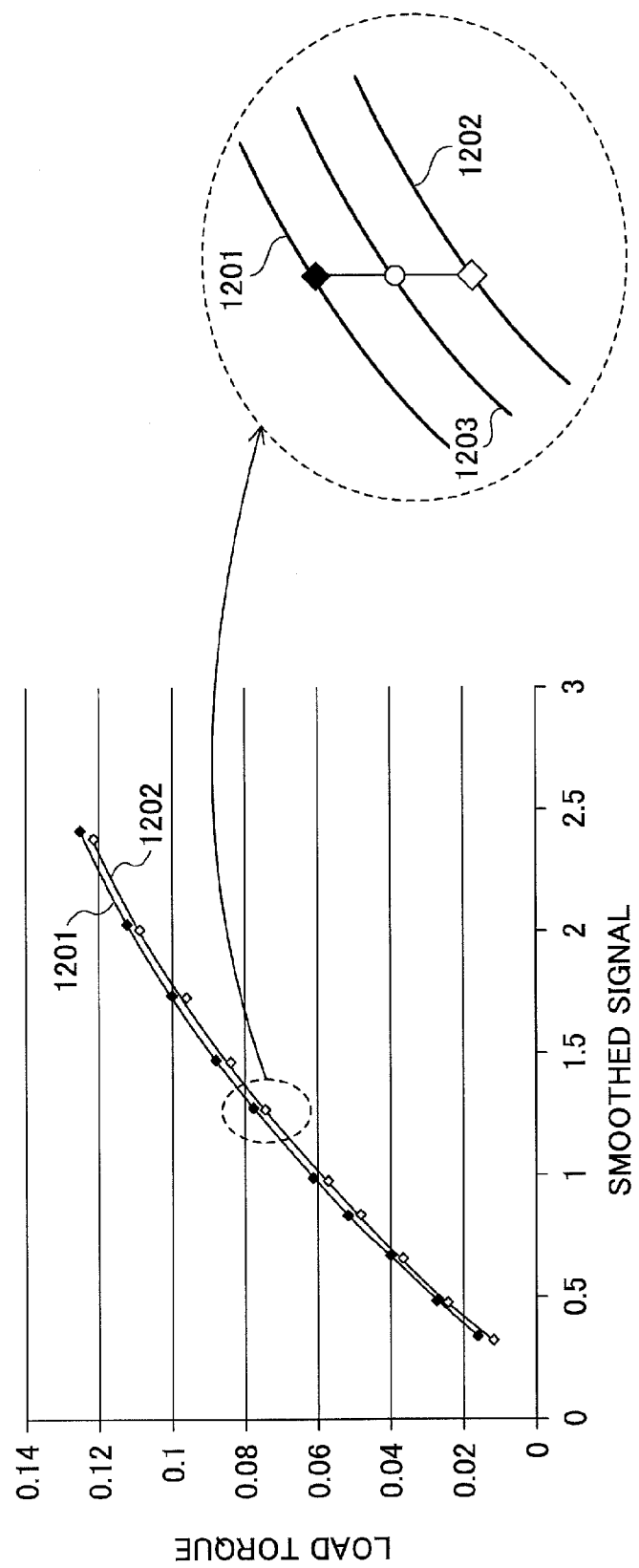
FIG. 12 is a diagram for explaining an example of an estimation method for estimating a relation between the smoothed signal and the load torque according to a third embodiment.

For example, a relation between smoothed signals and load torques, which is not obtained experimentally, may be estimated by using the relation between smoothed signals and load torques, which is obtained experimentally. FIG. 12 is a diagram for explaining an estimation method for estimating the relation between smoothed signals and load torques.

In FIG. 12, a graph 1201 represents the relation between smoothed signals and load torques obtained experimentally in a case where the rotational speed is 2250 rpm. Similarly, a graph 1202 represents the relation between smoothed signals and load torques obtained experimentally in a case where the rotational speed is 2150 rpm. The graph 1201 and the graph 1202 may be stored in the storage unit 214.

Here, relation between smoothed signals and load torques in a case where the rotational speed is 2200 rpm is estimated to be at an intermediate position between the rotational speed of 2150 rpm and the rotational speed if 2250 rpm.

Then, as shown in a drawing on the right side of FIG. 12, at respective values of the smoothed signals, intermediate positions between the load torques of the rotational speed of 2250 rpm and the load torques of the rotational speed of 2150 rpm are assigned to load torques of the rotational speed of 2200 rpm (see a graph 1203).

In this way, at the estimation unit 211, for example, load torques at the rotational speed of 2200 rpm are obtained for respective values of smoothed signals, and the load torque estimation formula at the rotational speed of 2200 rpm can be expressed as follows:

$$\text{Load torque } \tau=(\alpha_1+\alpha_2)/2 \times n^2+(\beta_1+\beta_2)2 \times n+(\gamma_1+\gamma_2)/2,$$

where the load torque estimation formula at the rotational speed of 2250 rpm is $$\text{Load torque } \tau=\alpha_1 \times n^2+\beta_1 \times n+\gamma_1,$$

and the load torque estimation formula at the rotational speed of 2150 rpm is $$\text{Load torque } \tau=\alpha_2 \times n^2 \beta_2 \times n+\gamma_2.$$

As can be seen from the above description, according to the present embodiment, a load torque estimation formula can be derived even if the relations between smoothed signals and load torques are not obtained experimentally for all the rotational speeds.

Fourth Embodiment

The first to third embodiments are explained under an assumption that the shunt resistor 430 is coupled to the emitter terminals of the transistors 404 to 406. But, the present invention is not limited to this. For example, the shunt resistor 430 may be coupled to a collector terminal side of the transistors 401 to 403 (between the power source 420 and the transistors 401 to 403).

Moreover, in the first to third embodiments, the relations between smoothed signals and load torques for respective rotational speeds are obtained experimentally in advance as relation information, and thereby the estimated torque value is output. However, the present invention is not limited to this. For example, relations between rotational speeds and load torques may be obtained experimentally for respective smoothed signals in advance as relation information, and thereby the estimated torque value is output. That is, a load torque estimation formula corresponding to a value of a smoothed signal of the electric motor during driving may be readout, a value of a rotational speed of the electric motor during driving is assigned to the load torque estimation formula, and thereby an estimated torque value is output.

Fifth Embodiment

The first to fourth embodiments are explained under an assumption that a measured value of rotational speed is fed back, and the control unit 201 carries out feedback control for the electric motor 140 to rotate at a target rotational speed. Alternatively, it is assumed that a measured value of rotational position is fed back, and the control unit 201 carries out the feedback control for the electric motor 140 to rotate to a target position.

However, in the present invention, a control carried out by the control unit 201 is not limited to this. For example, a speed feed forward control may be carried out from the target rotational speed. A position feed forward control may be carried out from the target position.

Moreover, the first to fourth embodiments are explained under an assumption that the estimated load torque is displayed on the display unit 115 (or stored in the auxiliary storage device 114) as an estimated torque value. But, the present invention is not limited to this. For example, the estimated load torque may be used for controlling a rotational speed or a rotational position by the control unit 201.

Sixth Embodiment

In the first to fifth embodiments, an application destination of the load torque estimation apparatus 100 is not specified. However, the load torque estimation apparatus 100 described in the first to fifth embodiments can be applied, for example, to an image forming apparatus in which an electric drive motor for rotationally driving a drive roller is arranged. Alternatively, the load torque estimation apparatus 100 can be applied to a car, a robot, an amusement device or the like.

Figure 13:
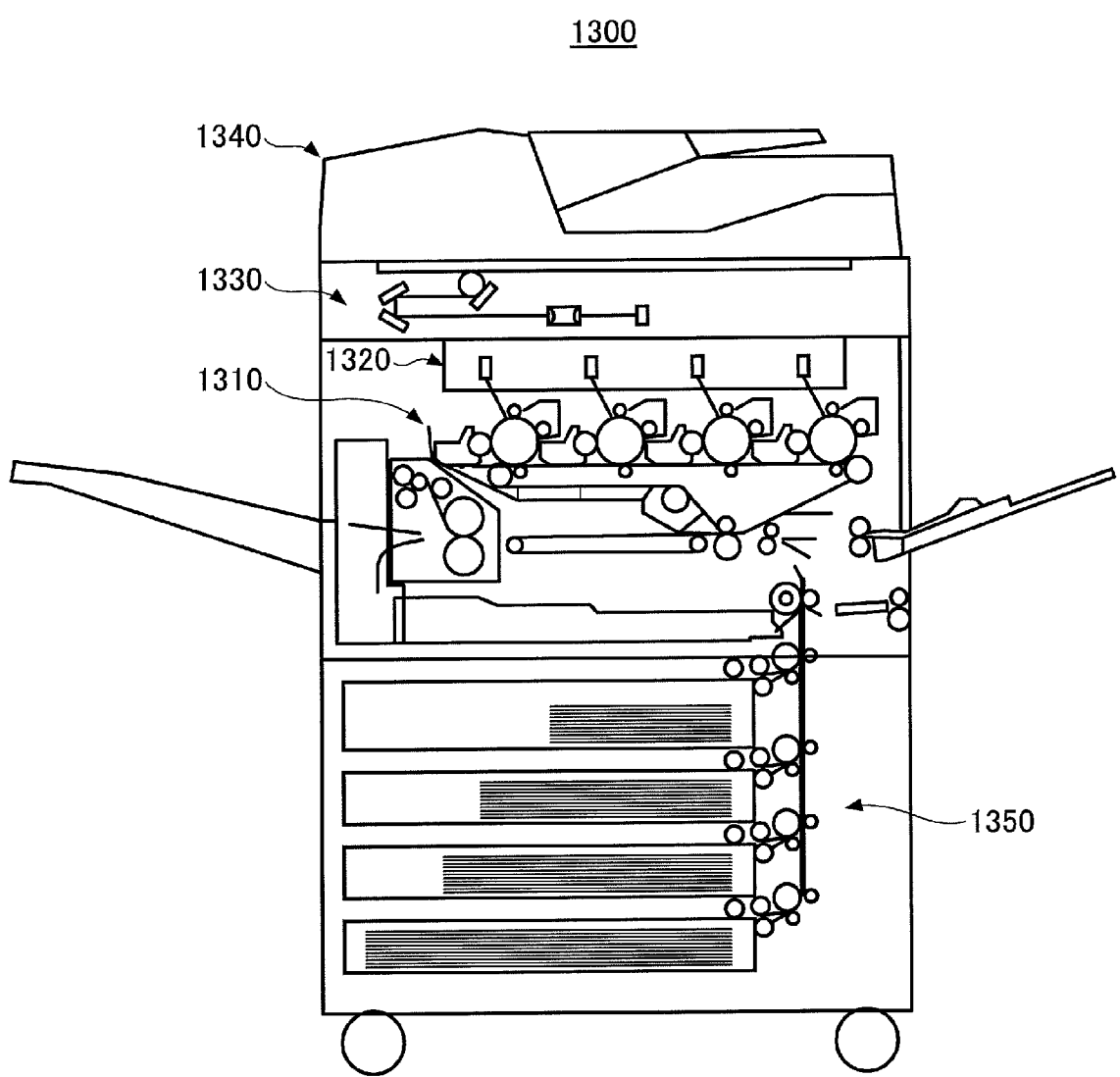
FIG. 13 is a diagram illustrating an example of a configuration inside an image forming apparatus according to a sixth embodiment.

FIG. 13 is a diagram illustrating an internal configuration of an image forming apparatus 1300 which is an example of the application destination of the load torque estimation apparatus 100. As shown in FIG. 13, the image forming apparatus 1300 includes an intermediate transfer unit 1310, an optical writing unit 1320, a scanner 1330, an automatic document conveyance device 1340 and a paper feeding device 1350.

Figure 14:
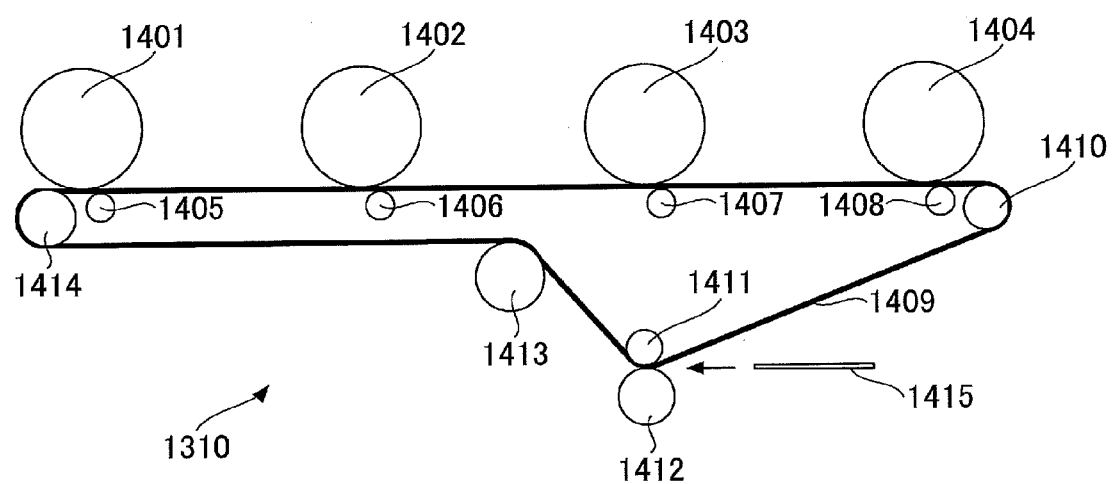
FIG. 14 is a diagram illustrating an example of a driving and conveyance mechanism in an intermediate transfer unit of the image forming apparatus in a magnified manner according to the sixth embodiment.

Moreover, FIG. 14 is a diagram illustrating a driving and conveyance mechanism in the intermediate transfer unit 1310 of the image forming apparatus 1300 in a magnified manner. As shown in FIG. 14, the driving and conveyance mechanism in the intermediate transfer unit 1310 includes an intermediate transfer belt 1409 as an intermediate transfer body, photoconductor drums 1401 to 1404 as image carriers, primary transfer rollers 1405 to 1408 as primary transfer members and a driving roller 1410. Moreover, the driving and conveyance mechanism in the intermediate transfer unit 1310 further includes a secondary transfer counter roller 1411, a secondary transfer roller 1412, a tension roller 1413, a driven roller 1414 and the like. Meanwhile, the driving roller 1410 is rotationally driven by an electric drive motor as a driving means.

An anomalous image originating in the driving and conveyance mechanism in the intermediate transfer unit 1310 of the image forming apparatus 1300 includes a banding phenomenon by which a belt-like density irregularity occurs periodically or randomly. Moreover, among the banding phenomena, especially a phenomenon called shock jitter is known, by which a belt-like density irregularity occurs at a specific timing due to a shock occurring upon a front edge or a tail edge of a recording medium 1415 passing the driving and conveyance mechanism, upon two kinds of driving and conveyance mechanisms contacting/separating or the like.

As a measure against the banding phenomena by the shock jitter, a method is known for reducing a variation in rotational speed of the driving roller 1410 with respect to a variation in load torque when the front edge or the tail edge of the recording medium 1415 passes a secondary transfer region. That is, a method is known for controlling the driving roller 1410 to rotate at a constant rotational speed even if the load torque varies.

The load torque estimation apparatus 100 according to the above-described embodiments is applied to the control of an electric drive motor for rotationally driving the driving roller 1410, and thereby load torque can be estimated with great accuracy. Then, the estimated load torque is fed back, and thereby influence from a variation in the load torque due to the shock jitter can be reduced.

Further, the present invention is not limited to these embodiments, but various variations and modifications may be made without departing from the scope of the present invention.

What is claimed is:

1. A load torque estimation apparatus comprising:
   a memory storing computer-readable instructions; and
   a processor configured to execute the computer-readable instructions to,
      store a table of relation information in a storage device, the relation information including approximation formulas defining relations between respective smoothed signals and load torque of an electric motor in association with respective target rotational speeds of the electric motor;
      acquire a smoothed signal obtained by smoothing an inter-shunt resistor voltage signal detected at a shunt resistor arranged in a driver configured to drive the electric motor, the inter-shunt resistor voltage signal indicating a composite current of electric currents flowing in respective phases of the electric motor during driving;
      acquire a rotational speed of the electric motor detected during driving;
      extract, from the table of relation information in the storage device, an approximation formula corresponding to the acquired rotational speed of the electric motor; and
      estimate load torque of the electric motor based on inputting the acquired smoothed signal into the extracted approximation formula corresponding to the acquired rotational speed of the electric motor.

2. The load torque estimation apparatus according to claim 1, wherein the processor is configured to execute the computer-readable instructions to acquire the smoothed signal via a low-pass filter configured to smooth the inter-shunt resistor voltage signal, and via an amplifier configured to amplify the smoothed inter-shunt resistor voltage signal.

3. The load torque estimation apparatus according to claim 2, wherein the low-pass filter and the amplifier are arranged in the driver of the electric motor.

4. The load torque estimation apparatus according to claim 1, wherein the processor is configured to execute the computer-readable instructions to acquire the smoothed signal via a peak value extractor configured to extract peak values of respective pulses in the inter-shunt resistor voltage signal and to amplify the peak values, and via a low-pass filter configured to smooth changes in the amplified peak values.

5. The load torque estimation apparatus according to claim 4, wherein the peak value extractor and the low-pass filter are arranged in the driver of the electric motor.

6. The load torque estimation apparatus according to claim 1, wherein the processor is further configured to execute the computer-readable instructions to:
store, in the table of relation information in the storage device, a first approximation formula for a first rotational speed of the electric motor and a second approximation formula for a second rotational speed of the electric motor, in association with the first rotational speed and the second rotational speed, respectively, and
derive a third approximation formula for a third rotational speed of the electric motor, the third rotational speed being between the first rotational speed and the second rotational speed, based on the first approximation formula for the first rotational speed and the second approximation formula for the second rotational speed.

7. An image forming apparatus comprising:
the load torque estimation apparatus according to claim 1.

8. The load torque estimation apparatus according to claim 1, wherein the processor is further configured to execute the computer-readable instructions to:
store, in the table of relation information in the storage device, approximation formulas defining relations between respective target rotational speeds and load torque of the electric motor in association with respective smoothed signals of the electric motor;
extract, from the table of relation information in the storage device, an approximation formula corresponding to the acquired smoothed signal of the electric motor; and
estimate load torque of the electric motor based on inputting the acquired rotational speed of the electric motor into the extracted approximation formula corresponding to the acquired smoothed signal of the electric motor.

9. A load torque estimation method comprising:
storing a table of relation information in a storage device, the relation information including approximation formulas defining relations between respective smoothed signals and load torque of an electric motor in association with respective target rotational speeds of the electric motor;
acquiring a smoothed signal obtained by smoothing an inter-shunt resistor voltage signal detected at a shunt resistor arranged in a driver configured to drive the electric motor, the inter-shunt resistor voltage signal indicating a composite current of electric currents flowing in respective phases of the electric motor during driving;
acquiring a rotational speed of the electric motor detected during driving;
extracting, from the table of relation information in the storage device, an approximation formula corresponding to the acquired rotational speed of the electric motor; and
estimating load torque of the electric motor based on inputting the acquired smoothed signal into the extracted approximation formula corresponding to the acquired rotational speed of the electric motor.

10. The load torque estimation method according to claim 9, further comprising:
storing, in the table of relation information in the storage device, approximation formulas defining relations between respective target rotational speeds and load torque of the electric motor in association with respective smoothed signals of the electric motor;
extracting, from the table of relation information in the storage device, an approximation formula corresponding to the acquired smoothed signal of the electric motor; and
estimating load torque of the electric motor based on inputting the acquired rotational speed of the electric motor into the extracted approximation formula corresponding to the acquired smoothed signal of the electric motor.

11. A non-transitory computer-readable recording medium storing a program for executing a process of estimating load torque of an electric motor, the program when executed causing a computer to:
store a table of relation information in a storage device, the relation information including approximation formulas defining relations between respective smoothed signals and load torque of the electric motor in association with respective target rotational speeds of the electric motor;
acquire a smoothed signal obtained by smoothing an inter-shunt resistor voltage signal detected at a shunt resistor arranged in a driver configured to drive the electric motor, the inter-shunt resistor voltage signal indicating a composite current of electric currents flowing in respective phases of the electric motor during driving;
acquire a rotational speed of the electric motor detected during driving;
extract, from the table of relation information in the storage device, an approximation formula corresponding to the acquired rotational speed of the electric motor; and
estimate load torque of the electric motor based on inputting the acquired smoothed signal into the extracted approximation formula corresponding to the acquired rotational speed of the electric motor.

12. The non-transitory computer-readable recording medium according to claim 11, the program when executed further causing the computer to:
store, in the table of relation information in the storage device, approximation formulas defining relations between respective target rotational speeds and load torque of the electric motor in association with respective smoothed signals of the electric motor;
extract, from the table of relation information in the storage device, an approximation formula corresponding to the acquired smoothed signal of the electric motor; and
estimate load torque of the electric motor based on inputting the acquired rotational speed of the electric motor into the extracted approximation formula corresponding to the acquired smoothed signal of the electric motor.

* * * * *